Patented Sept. 21, 1954

2,689,789

UNITED STATES PATENT OFFICE 2,689,789

QUATERNARY NITROGEN COMPOUND HERBICIDES

David T. Mowry and Arthur H. Schlesinger, Dayton, Ohio, assignors to Monsanto Chemical Company, St. Louis, Mo., a corporation of Delaware No Drawing. Application August 25, 1951,
Serial No. 243,751

10 Claims. (Cl. 71—2.3)

The present invention relates to quaternary nitrogen compounds and provides certain new alkylbenzyl ammonium halides, herbicidal compositions containing the new halides and methods of destroying undesirable plants wherein such compositions are employed.

According to the invention there are prepared new and useful quaternary nitrogen compounds having the general formula

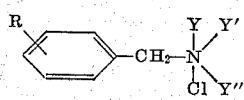

in which R is an alkyl radical of from 5 to 9 carbon atoms, Y, Y' and Y" are selected from the class consisting of the phenyl radical and alkyl radicals of from 1 to 5 carbon atoms, and in which only one of Y, Y' and Y" is phenyl.

Quaternary nitrogen compounds having the above general formula are readily obtainable by the addition reaction of an ar-alkylbenzyl chloride in which the alkyl radical has from 5 to 9 carbon atoms with a trialkylamine or with a phenyldialkylamine in which each alkyl radical has from 1 to 5 carbon atoms. As illustrative of useful ar-alkylbenzyl chlorides may be mentioned, e. g., 4-n-amylbenzyl chloride, 2-isoamylbenzyl chloride, 4-n-hexylbenzyl chloride, 3 - n - heptylbenzyl chloride, 4-(2-ethylhexylbenzyl) chloride, 4-n-octylbenzyl chloride, 4-n-nonylbenzyl chloride, 4-tert-nonylbenzyl chloride, etc. Trialkylamines or phenyldialkylamines which may be reacted with the above ar-alkylbenzyl halides to yield the present ar-alkylbenzyl quaternary compounds are, e. g., trimethylamine, triethylamine, ethyldimethylamine, tri - n - propylamine, triisopropylamine, tri-n-butylamine, ethylmethylbutylamine, tri-n-amylamine, tri-tert-amylamine, N,N-dimethylaniline, N,N-di-n-amylaniline, N,N-diisobutylaniline, N-ethyl-N-methylaniline, etc.

(ar - Alkylbenzyl) trialkylammonium chlorides or (ar - alkylbenzyl) phenyldialkylammonium chlorides provided by the present invention include, e. g., 4-n-amylbenzyltrimethylammonium chloride, (4 - sec-amylbenzyl) trimethylammonium chloride, (3-tert-amylbenzyl) tri-n-amylammonium chloride, (4-n-hexylbenzyl)-diethylmethylammonium chloride, (2-n-heptylbenzyl)-triisopropylammonium chloride, (4 - isooctylbenzyl) triisobutylammonium chloride, [4 - (2-ethylhexyl) benzyl] trimethylammonium chloride, (4-n-octylbenzyl) tri - n - amylammonium chloride, (4-tert-nonylbenzyl) diethyl-n-propylammonium chloride, (2-n-nonylbenzyl) tri-n-butylammonium chloride, (4 - sec - amylbenzyl)-phenyldimethylammonium chloride, (4-n-hexylbenzyl) phenyl - di-n-amylammonium chloride, (4 - n - nonylbenzyl) ethylmethylphenylammonium chloride, etc.

Reaction of the ar-alkylbenzyl chloride with the trialkylamine is effected by maintaining a mixture of the two reactants, advantageously in stoichiometric proportions at ordinary or increased temperature until formation of the quaternary compound has occurred. For optimum yields, it is preferred to heat a solution of the reactants at the refluxing temperature of the solution for a time of, say, from several hours to a day. The quaternary compound which is formed may be separated from the resulting reaction mixture by customary isolating procedures, i. e., distillation, extraction, etc.

The present quaternary nitrogen compounds are effective herbicides over wide ranges of concentrations. Their effectiveness may be measured by spraying plants grown under standard conditions with aqueous solutions and then observing the sprayed plants during a standard length of time. The herbicidal efficiency of the present compounds may also be measured by determining the root growth when seedlings are grown in media containing the present compounds as compared to the roots of similar plants grown in absence of the chemicals.

The present invention is illustrated, but not limited, by the following examples:

Example 1

A mixture consisting of 24.2 g. (0.20 mole) of phenyldimethylamine and 40 g. (0.20 mole) of 4-sec-amylbenzyl chloride in 150 ml. of alcohol was refluxed for about 18 hours. At the end of that time the reaction mixture was filtered to remove a small quantity of crystalline material, which was probably the amine hydrochloride. Alcohol was removed from the filtrate by distillation in vacuo, and the residual syrup was washed several times with ether. Drying the washed material overnight in a vacuum oven yielded 40 g. (63% theoretical yield) of the green, viscous phenyldimethyl - (4 - sec-amylbenzyl)-ammonium chloride, analyzing 12.74% ionic chlorine (calcd. Cl for $C_{20}H_{28}NCl$, 11.18%).

Example 2

Tri-n-amylamine (15 g., .066 mole) was refluxed for 18 hours with 4-sec-amylbenzyl chloride (14 g., 0.71 mole) in 100 ml. of ethyl alcohol. Upon removal of the alcohol from the resulting reaction mixture and oven-drying of the residue there was obtained 22 g. (79% theoretical yield) of the tri-n-amyl-(4-sec-amylbenzyl) ammonium chloride, a yellow syrup.

*Example 3*

To 200 ml. of a 25% methanol solution of trimethylamine there was added 40 g. of 4-sec-amylbenzyl chloride, and the whole was heated on a steam bath for one hour. The hot, almost homogeneous reaction mixture was then diluted with an equal volume of ethanol, and refluxed overnight. Removal of the alcohol by vacuum distillation, ether-washing of the residue, and oven-drying of the washed residue yielded 50 g. (99% theoretical yield) of the yellow, gel-like trimethyl-(4-sec-amylbenzyl)ammonium chloride, analyzing 12.26% ionic chlorine (calcd. Cl for $C_{15}H_{26}NCl$, 13.90%).

*Example 4*

In this example there was used a branched chain 4-nonylbenzyl chloride, B. P. 130-8° C./2 mm., $n_D^{25}$ 1.5105 (prepared by chloromethylation of a branched-chain 4-nonylbenzene sold by Sharples Continental Corporation). A mixture of 30 g. of the chloride and 100 ml. of a 25% solution of trimethylamine in methanol was refluxed for 3 hours. At the end of that time 100 ml. of ethanol was added to the reaction mixture and refluxing was continued for an additional 16 hours. The alcohol was removed from the reaction product by distillation in vacuo, and the residue was washed several times with ether. The washed and dried residue, comprising the substantially pure branched-chain (4-nonylbenzyl)trimethylammonium chloride, was obtained in 95% theoretical yield. It was found to possess the herbicidal properties shown in Examples 5 and 6.

*Example 5*

Herbicidal activity of the present compounds was determined by germination of cucumber seeds and of wheat seeds for 4 days at a temperature of 76° F. in the presence of aqueous suspensions of each of the indicated chemicals at concentrations of 100 p. p. m. Fifty seeds were used for each test. The results are expressed as per cent length of the primary roots in the presence of the chemical as compared with the length of the primary roots of controls which had been germinated in water. The activities of isopropyl carbanilate and 2,4-dichlorophenoxy-acetic acid, as determined by the same test, are included for comparison.

| Compound Tested | Percent Growth at 100 Parts Per Million | |
| --- | --- | --- |
| | Cucumber | Wheat |
| (4-sec-Amylbenzyl)tri-n-amylammonium chloride | 4 | 3 |
| (4-sec-Amylbenzyl)trimethylammonium chloride | 14 | 5 |
| (4-sec-Amylbenzyl)phenyldimethylammonium chloride | 7 | 10 |
| (4-Nonylbenzyl)trimethylammonium chloride (Example 4) | 3 | 11 |
| Isopropyl carbanilate | 14 | 2 |
| 2,4-Dichlorophenoxyacetic acid | 6 | 4 |

The herbicidal efficiency of the present compounds is surprising, for quaternary ammonium compounds derived from ar-alkylbenzyl halides do not generally possess great herbicidal activity. When tested as disclosed above, aqueous suspensions of a random group of such compounds were found to have the following effects:

| Compound Tested | Percent Growth at 100 Parts per Million | |
| --- | --- | --- |
| | Cucumber | Wheat |
| (4-sec-Butylbenzyl)phenyldimethylammonium chloride | 95 | 71 |
| (4-Isopropylbenzyl)trimethylammonium chloride | 50 | 32 |
| (4-sec-Butylbenzyl)trimethylammonium chloride | 36 | 34 |
| (4-sec-Amylbenzyl)-bis-(2-hydroxyethyl)-phenylammonium chloride | 89 | 91 |
| (n-Hexadecylbenzyl)trimethylammonium chloride | 32 | |
| 4-sec-Amylbenzyl-tris-(2-hydroxyethyl)-ammonium choride | 100 | |

*Example 6*

Spray testing of the herbicidal activity of some of the present compounds was conducted as follows:

A 1% aqueous suspension of the quaternary compound was prepared, employing 0.2% of an emulsifying agent known to the trade as "Emulsifier L" and comprising a mixture of a polyethylene glycol derivative and an alkylbenzene-sulfonate. This 1% aqueous suspension was further diluted with water to give a suspension having a 0.3% concentration of the quaternary compound.

Three-week old corn and bean plants were respectively sprayed with 1.0% and 0.3% suspensions, two plants of each variety being used for each test. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain in the same greenhouse for a period of one week. At the end of that time the sprayed plants were compared with the untreated plants in order to determine the extent of injury, if any. The following observations were made:

| Compound Tested at percent concentration | Injury Effect on— | |
| --- | --- | --- |
| | Bean | Corn |
| (4-sec-Amylbenzyl)trimethylammonium chloride: | | |
| 0.3% | Moderate | Moderate. |
| 1.0% | Severe (leaves dried). | Severe. |
| (4-sec-Amylbenzyl)tri-n-amylammonium chloride: | | |
| 0.3% | Severe | Moderate. |
| 1.0% | Plant dead (leaves dried). | Plant dead (leaves dried). |
| Branched-chain (4-Nonylbenzyl)trimethylammonium chloride: | | |
| 0.3% | Severe | Slight. |
| 1.0% | Plant dead (leaves dried). | Plant dead (leaves dried). |

The very good herbicidal activity of the present compounds is evidenced by the pronounced injury effected upon both the corn and bean plants at concentrations of as little as 0.3%. Drying of the bean leaves is of particular significance. This data indicates that the present herbicides may be used as defoliating agents previous to the harvesting of bean crops in order to facilitate mechanical picking of the beans.

Similar testing of closely related compounds, e. g., (4-isopropylbenzyl)trimethylammonium chloride or of (diisopropyl)-trimethylammonium chloride showed substantially no effect on the plants at these concentrations.

Herbicidal compositions containing the present quaternary compounds may be aqueous solutions of compounds or oil-in-water emulsions of herbicidal petroleum or coal tar oils suspended in aqueous solutions of the compounds. The aqueous solutions or suspensions may be obtained simply by agitating the compounds in water in effective proportions in the presence or absence of known dispersing, emulsifying, wetting or penetrating agents. Dispersing or emulsifying agents are advantageously employed in the preparation of the aqueous suspensions or oil-in-water emulsions and a wetting or penetrating agent is desirable in simple aqueous solutions. The present compounds are preferably applied by spraying aqueous solutions of the same, this method affording an easy and inexpensive way of destroying plant growth. However, they are likewise effective when applied in agricultural dusts; or they may be used with water-insoluble insecticides, fungicides, etc., in customarily employed organic solutions.

Because of the high herbicidal activity of the present compounds they are advantageously applied by mixing them with inert ingredients as carriers. Valuable herbicidal compositions are prepared by incorporating small amounts of the compounds into fluent carriers such as water, and organic solvents for the compounds. Sprays may also be prepared by dissolving the chemicals in water or in organic solvents to make concentrates and then adding small amounts of the concentrates to water, advantageously in the presence of an emulsifying or dispersing agent. Solutions, emulsions and dispersions thus prepared have the property of adhering to the plant foliage for a long time.

What we claim is:

1. A herbicidal composition comprising an oil-in-water emulsion of (4-sec-amylbenzyl)tri-n-amylammonium chloride, said chloride being present in said emulsion in a quantity which is injurious to living plants.

2. A herbicidal composition comprising an oil-in-water emulsion of (4-sec-amylbenzyl)trimethylammonium chloride, said chloride being present in said emulsion in a quantity which is injurious to living plants.

3. A herbicidal composition comprising an oil-in-water emulsion of (4-sec-amylbenzyl)phenyldimethylammonium chloride, said chloride being present in said emulsion in a quantity which is injurious to living plants.

4. A herbicidal composition comprising an oil-in-water emulsion of (4-tert-nonylbenzyl)trimethylammonium chloride, said chloride being present in said emulsion in a quantity which is injurious to living plants.

5. The method of destroying undesirable plants which comprises contacting said plants with a herbicidal composition comprising an inert carrier and (4-sec-amylbenzyl)tri-n-amylammonium chloride as the essential active ingredient, said chloride being present in said composition in a quantity which is injurious to said plants.

6. The method of destroying undesirable plants which comprises contacting said plants with a herbicidal composition comprising an inert carrier and (4-sec-amylbenzyl)trimethylammonium chloride as the essential active ingredient, said chloride being present in said composition in a quantity which is injurious to said plants.

7. The method of destroying undesirable plants which comprises contacting said plants with a herbicidal composition comprising an inert carrier and (4-sec-amylbenzyl)phenyldimethylammonium chloride as the essential active ingredient, said chloride being present in said composition in a quantity which is injurious to said plants.

8. The method of destroying undesirable plants which comprises contacting said plants with a herbicidal composition comprising an inert carrier and (4-tert-nonylbenzyl)trimethylammonium chloride as the essential active ingredient, said chloride being present in said composition in a quantity which is injurious to said plants.

9. A herbicidal composition comprising an oil-in-water emulsion of a quaternary nitrogen compound having the formula

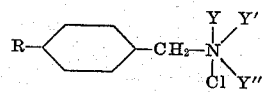

in which R is an alkyl radical of from 5 to 9 carbon atoms, Y and Y' are alkyl radicals of from 1 to 5 carbon atoms and Y'' is selected from the class consisting of the phenyl radical and alkyl radicals of from 1 to 5 carbon atoms, said nitrogen compound being present in said emulsion in a quantity which is toxic to plant life.

10. The method of destroying undesirable plants which comprises contacting said plants with a herbicidal composition comprising an inert carrier and as the essential active ingredient, in a quantity which is injurious to said plants, a quaternary nitrogen compound having the formula

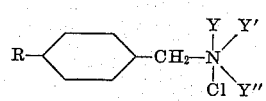

in which R is an alkyl radical of from 5 to 9 carbon atoms, Y and Y' are alkyl radicals of from 1 to 5 carbon atoms and Y'' is selected from the class consisting of the phenyl radical and alkyl radicals of from 1 to 5 carbon atoms.

References Cited in the file of this patent

UNITED STATES PATENTS

| Number | Name | Date |
|---|---|---|
| 2,248,342 | De Groote | July 8, 1941 |
| 2,314,111 | Tucker et al. | Mar. 16, 1943 |
| 2,383,775 | Craig et al. | Aug. 28, 1945 |
| 2,569,408 | De Benneville | Sept. 25, 1951 |
| 2,636,036 | Du Bois et al. | Apr. 21, 1953 |

FOREIGN PATENTS

| Number | Country | Date |
|---|---|---|
| 965,159 | France | Feb. 8, 1950 |
| 499,203 | Great Britain | Jan. 16, 1939 |